3,248,402
BENZOYLPROPYL DERIVATIVES OF FUR-FURYLAMINES AND TETRAHYDROFUR-FURYLAMINES

Meier E. Freed, Philadelphia, Pa., assignor to American Home Products Corporation, New York, N.Y., a corporation of Delaware
No Drawing. Filed Oct. 20, 1964, Ser. No. 405,241
5 Claims. (Cl. 260—347.7)

This invention relates in general to compounds classified in the art of chemistry as N-(p-fluorobenzoyl)alkyl-furfuryl- and tetrahydrofurfurylamines.

The compounds herein disclosed and claimed possess central nervous system depressant activity, analgesic and anti-convulsant activities, as determined by standard experimental procedures with warm-blooded animals.

The claimed compounds are generically represented by the following general formula:

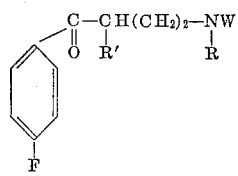

wherein R is lower alkyl; R' is hydrogen or lower alkyl; and W is either the furfuryl or the tetrahydrofurfuryl radical.

As used herein, the term "lower alkyl" refers to those hydrocarbon moieties which are either straight chain or branched and which have up to four carbon atoms in the chain.

The compounds indicated above are basic in nature, and exhibit a capacity for salt formation with pharmaceutically acceptable acids. These may be inorganic acids such as hydrochloric or nitric, or organic such as the simple monocarboxylic acids, acetic, propionic, butyric, etc., to cite a few of such capable of use.

The compounds of the invention as described above are prepared in general by utilizing as starting materials certain known 4-halo-p-fluorobutyrophenones of the general structure:

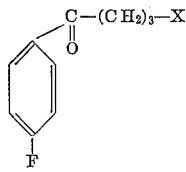

wherein the halogen atom represented by X may be any of the commonly recognized halogen substituents such as chloro, bromo, and iodo.

In the practise of the invention, said 4-butyrophenones are reacted with an approximately equimolar amount of an amine of the formula $$\underset{RNW}{\overset{H}{|}}$$

where R and W are as above-stated, in a suitable inert solvent such as toluene, xylene, or the like at the reflux temperature of the solvent employed, and for from 1 to 24 hours, depending upon the particular compound sought to be prepared, the inert solvent employed, etc. The subject reaction is carried out in the presence of acid scavenging means provided in the reaction mixture by either using an excess of the amine reactant or by adding to the mixture another amine such as diisopropylamine or a finely divided inorganic compound such as potassium or sodium carbonate. Generally, it is preferable to reflux the reactants for 24 hours under autogenous pressure. The reaction mixture is then allowed to cool to room temperature and about twice its volume of ether is added causing the acid scavenger hydrohalide to precipitate. Filtering of the solution is the next operation following which the precipitate is discarded. However, if it is desired to determine the extent to which the reaction has taken place, such determination can be made by washing this precipitate with ether, drying it and weighing it. In any event, the filtrate obtained from the reaction mixture is extracted with dilute mineral acid; the extracts are made alkaline with strong base, thereby forming an oily layer which is extracted with ether. The ether extracts are washed and dried. The product is recovered by vacuum distillation of the residue remaining following removal of the ether.

The N - (lower)alkyl-N-[(3-p-fluorobenzoyl)propyl]-furfuryl- or tetrahydrofurfurylamine product thus formed can be treated further in a solvent such as toluene with an equimolar amount of sodium hydride and then with an equimolar amount of a lower alkyl iodide or a lower alkyl p-toluenesulfonate to alkylate the carbon atom adjacent to the carbonyl carbon and thereby form those compounds of the general formula where R' is lower alkyl.

The reactants used in preparing the claimed compounds are known to those skilled in the art or are obtainable by processes known to those skilled in the art.

As therapeutic agents these novel compounds are preferably administered in oral dosage forms such as tablets, capsules, or similar oral medicaments. However, where rapid effects are desired, the compounds will be intraperitoneally or intravenously administered, and thus made available for fast action.

When orally administered in unit dosage forms they may if desired be admixed with such conventional excipients as lactose, starch, magnesium stearate, and the like. In the intravenous preparation they are, of course, in a liquid form admixed if desired with pharmaceutically acceptable alcohols such as ethanol and the like, water, and isotonic saline. In any event, the dosage of active ingredient may range from about 0.5 milligram to about 150 milligrams per daily dose, and preferably 5 to 50 milligrams per daily dose, as required by the particular condition to be managed.

The following several examples serve only to further illustrate the product and process concepts of the invention in specific embodiment form.

EXAMPLE 1

N-methyl-N-[3-(p-fluorobenzoyl)propyl]-tetrahydrofurfurylamine

To a solution of N-methyl-N-tetrahydrofurfurylamine (0.15 mole, 17.5 g.) and diisopropylamine (0.15 mole, 15.2 g.) in 75 ml. of refluxing toluene was added slowly to a solution of 4-chloro-4'-fluorobutyrophenone (0.15 mole, 30.2 g.) in 75 ml. of toluene. After refluxing for 24 hrs., the reaction mixture was allowed to cool and ether (350 ml.) was added. After standing in the cold the solid filtered off, washed with ether, and dried. The filtrate was extracted with dilute hydrochloric acid (4×250 ml. of 100% HCl). The aqueous acid was then made basic with sodium hydroxide and the oil layer taken up in ether. The ether solution was washed with saline and dried over sodium sulfate. After removing the solvent, the residue was distilled and afforded 25.4 g. (60.8%) of product. B.P. 135–138° C./.1 mm.

Analysis.—Calcd. for $C_{16}H_{22}FNO_2$: C, 68.79; H, 7.94; N, 5.01. Found: C, 68.34; H, 7.82; N, 4.91.

The base was converted to the hydrochloride by treating of an alcoholic solution with dry hydrogen chloride. Ether was added until the product crystallized. After recrystallization from methanol-ether, the hydrochloride had a melting point of 143.5° to 145.5°.

*Analysis.*—Calcd. for $C_{16}H_{23}ClFNO_2$: C, 60.85; H, 7.34; Cl, 11.22; N, 4.44. Found: C, 61.05; H, 7.31; Cl, 11.2; N, 4.53.

EXAMPLE 2

*N-methyl-N-[3-(p-fluorobenzoyl)propyl]-furfurylamine*

N-methylfurfurylamine (17.5 g.) was treated with 4-chloro-4'-fluorobutyrophenone (30.2 g.) in the presence of diisopropylamine (15.2 g.) as described for Example 1. The product was obtained (23.25 g., 55%); B.P. 129–140/0.1 mm.

*Analysis.*—Calcd. for $C_{16}H_{18}FNO_2$: C, 69.80; H, 6.54; N, 5.09. Found: C, 69.81; H, 6.67; N, 4.90.

The hydrochloride salt was prepared in the usual way and melted 125.5–128° (acetone-ether).

*Analysis.*—Calcd. for $C_{16}H_{19}ClFNO_2$: C, 61.65; H, 6.14; Cl, 11.37; N, 4.49. Found: C, 61.60; H, 6.07; Cl, 11.35; N, 4.37.

EXAMPLE 3

*N-methyl-N-[3-(p-fluorobenzoyl)butyl]-tetrahydrofurfurylamine*

Treatment of N - methyl-N-[3-(p-fluoro-benzoyl)propyl]-tetrahydrofurylamine (.1 mole) in toluene with sodium hydride (0.1 mole), followed by 0.1 mole of methyl-iodide yields the title compound.

EXAMPLE 4

*N-ethyl-N-[3-(p-fluorobenzoyl)-propyl]tetrahydrofurfurylamine*

This compound is prepared as in Example 1, but by using N-ethyl-tetrahydrofurfurylamine instead of the N-methyl compound.

Using the appropriate starting materials the following products are obtained. These products are tabulated below to avoid the unnecessary repetition of experimental details.

| Example | R | R' | W |
|---|---|---|---|
| 5 | $C_3H_7$ | $CH_3$ | Furfuryl. |
| 6 | $C_3H_7$ | $CH_3$ | Tetrahydrofurfuryl. |
| 7 | $C_4H_9$ | $C_4H_9$ | Furfuryl. |
| 8 | $CH_3$ | $C_4H_9$ | Tetrahydrofurfuryl. |

What is claimed is:

1. A compound of the formula:

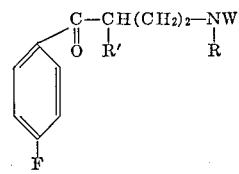

wherein R is lower alkyl; R' is selected from the group of hydrogen and lower alkyl; and W is selected from the group of furfuryl and tetrahydrofurfuryl; and the pharmaceutically acceptable acid addition salts thereof.

2. N-methyl - N - [3-p-fluorobenzoyl)propyl]-tetrahydrofurfurylamine.

3. N-methyl - N - [3-(p-fluorobenzoyl)propyl]-tetrahydrofurylamine hydrochloride.

4. N - methyl-N-[3-(p-fluorobenzoyl)propyl]-furfurylamine.

5. N - methyl-N-[3-(p-fluorobenzoyl)propyl]-furfurylamine hydrochloride.

No references cited.

NICHOLAS S. RIZZO, *Primary Examiner.*